Figure 1:
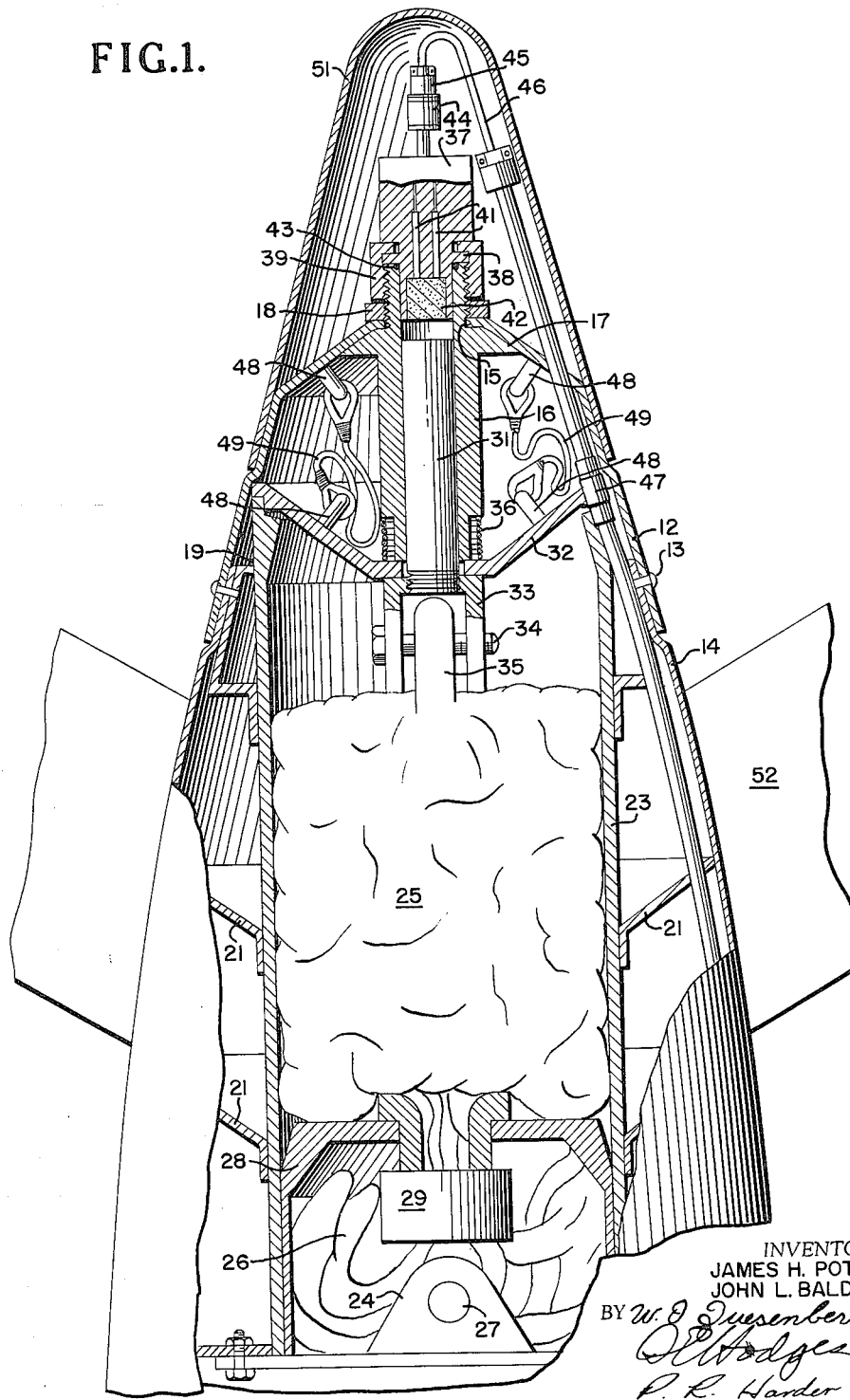

June 4, 1963  J. H. POTTS, JR., ETAL  3,092,358
PARACHUTE PACK OPENER

Filed Sept. 20, 1961  2 Sheets-Sheet 1

INVENTORS.
JAMES H. POTTS, JR.
JOHN L. BALDWIN, JR.

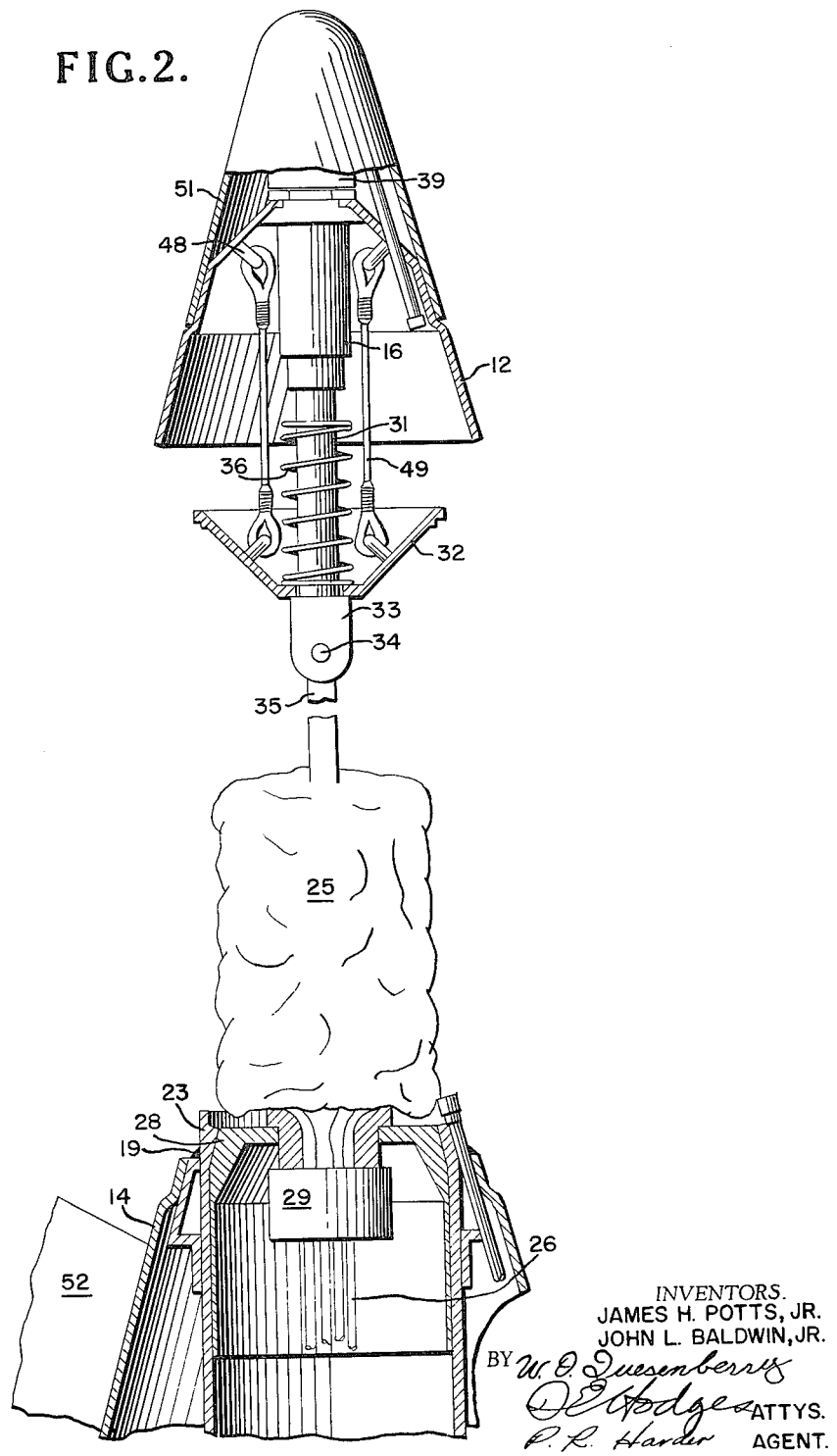

3,092,358
PARACHUTE PACK OPENER
James H. Potts, Jr., Silver Spring, and John L. Baldwin, Jr., Hyattsville, Md., assignors to the United States of America as represented by the Secretary of the Navy
Filed Sept. 20, 1961, Ser. No. 140,174
7 Claims. (Cl. 244—147)
(Granted under Title 35, U.S. Code (1952), sec. 266)

The invention described herein may be manufactured and used by or for the Government of the United States of America for governmental purposes without the payment of any royalties thereon or therefor.

The present invention relates generally to an extraction parachute pack and more particularly to an extraction parachute pack opener which utilizes the explosive force of an explosive fitting to shear a plurality of rivets to detach the extraction parachute housing from the tail fairing of a bomb, torpedo, or the like, and to extract the parachute contained within the housing.

In the field of aerial laid mines, torpedoes, rescue equipment and the like, utilizing a parachute therewith, it has been the general practice to provide the device to be air dropped with a large parachute enclosed in a parachute housing attached to the device, which after release from the aircraft is ejected to deploy the large parachute. In order to prevent the main parachute housing from becoming entangled in the large parachute and to aid in the extraction of the large parachute, it has been the general practice to employ a second smaller parachute attached to the parachute housing which is deployed before operation of the main parachute pack opening mechanism. This smaller parachute, commonly known as an extraction parachute, is attached to the main parachute housing not only to aid in the removal of the main parachute housing but also to suspend the main housing after separation from the main parachute.

The general purpose of this invention, therefore, is to provide an extraction parachute pack and pack opener which insures rapid extraction and deployment of the parachute. To obtain this result, the present invention contemplates a hollow sleeve containing an explosive attached to a housing that is riveted to the tail fairing. A stem attached to a bell-shaped member extends within the sleeve and closely abuts the explosive contained therein. The bell-shaped member is connected by a plurality of tie-lines to the housing and by a single attachment line to the extraction parachute. Upon detonation of the explosive, the rivets attaching the housing to the tail fairing are sheared and the sleeve is translated along the stem with great force. When the tie-lines tighten, the bell-shaped member is pulled after the sleeve thereby extracting the small parachute from its housing with great speed. The attachment line connected to the bell-shaped member and to the parachute subsequently parts to separate the pack opening members from the parachute. The shroud lines for the extraction parachute are secured to the tail fairing and operate to subsequently aid in the extraction of the larger parachute and suspension of the tail fairing after separation from the large parachute.

It should be understood, however, that the device described herein need not be utilized as an extraction parachute which suspends a tail fairing and aids in extraction of a larger parachute, but may be utilized alone if the parachute contained therein is sufficient to suspend the load attached thereto.

It is, therefore, an object of the present invention to provide a parachute pack opener which insures positive opening of the parachute pack and rapid deployment of the parachute.

Another object is to provide a parachute pack opener which utilizes an explosive force to effect separation of the pack parts and deployment of the parachute attached thereto.

A further object is the provision of a parachute pack opening mechanism having sufficient force to shear a plurality of rivets securing the pack opener parts together and to forcibly deploy the parachute contained within the parachute pack.

Still another object is to provide a parachute pack opener which forcibly deploys the parachute attached thereto and subsequently is detached from the parachute.

Yet another object is to provide an extraction parachute pack and pack opening mechanism which insures rapid deployment of an extraction parachute which subsequently suspends the main parachute housing to prevent entanglement thereof with the main parachute.

Other objects and many of the attendant advantages of this invention will be more readily appreciated as the same becomes better understood by reference to the following detailed description when considered in connection with the accompanying drawings in which like reference numerals designate like parts throughout the figures thereof and wherein:

FIG. 1 is a view, partially in section, of an extraction parachute pack and pack opener embodying the instant invention before actuation of the pack opener; and FIG. 2 is a pictorial view of a bomb or torpedo having an extraction parachute attached thereto after actuation of the extraction parachute pack opener but before complete deployment of the extraction parachute.

Referring now to the drawings and more particularly to FIG. 1 thereof, there is illustrated a pack opener housing 12 secured by a plurality of circumferentially spaced rivets 13 to a tail fairing 14. The number and strength of the rivets 13 are merely sufficient to maintain the housing 12 secured to tail fairing 14 during handling and subsequent launching of the mine or torpedo to which the tail fairing is attached, but are insufficient to hold the housing upon detonation of the pack opening mechanism as will become more readily understood as the description proceeds.

Secured within the aperture 15 in the housing 12 is a hollow cylindrical sleeve 16 having a flange 17 which is held in abutting relation with the housing 12 by nut 18 threaded to the cylindrical sleeve 16. Secured within the tail fairing 14 by weld 19 and brackets 21 is a cylindrical parachute housing 23 having a pair of lugs 24 integrally formed therewith. Contained within housing 23 is a parachute 25 having its shroud lines 26 secured to a clevis pin 27 extending through the lugs 24. The shroud lines extend through a sliding cup 28 and a retaining ring 29 for reasons which will become more readily understood as the description proceeds.

A solid cylindrical stem 31 extends within the sleeve 16 and has a bell-shaped member 32 and a lug 33 threaded to one end thereof. The lug 33 has a clevis pin 34 extending therethrough to which is secured an attachment line 35 connected to parachute 25 near its crown. The bell-shaped member 32 is held in abutting relation with the end of the parachute housing 23 by spring 36 surrounding the sleeve 16 and abutting the bell-shaped member 32.

An explosive fitting 37 having a flange 38 thereon abuts and extends within the sleeve 16 and is secured thereto by a cap 39 threaded to the upper portion of sleeve 16 and engaging the flange 38. The explosive fitting contains a plurality of time-delayed, electrically fired detonating caps 41 and an explosive 42 closely adjacent the upper surface of stem 31. The explosive may, if desired, be sealed within the sleeve 16 by any suitable means, such, for example, as the pressure seal 43 illustrated. The cable adapter 44 is threaded to the explosive fitting 37 and is adapted to receive a fitting 45 on cable 46 to complete the necessary electrical connection from cable 46 to the detonating caps 41. Cable 46 extends through an aperture in the housing 12 and is provided with a quick opening, pull-type connection 47 at the point where the cable passes through the tail fairing 14. The cable 46 extends through the tail fairing 14 and is connected to any suitable firing circuit contained within the bomb or mine to be air dropped as will become more readily apparent hereinafter.

Secured to or formed integrally with housing 12 and the bell-shaped member 32 are a plurality of retaining rings 48 secured together by a plurality of tie-lines 49. Secured to the housing 12 by any suitable means, not shown, is a cover 51 which enhances the aerodynamic characteristics of the device to be air dropped but which, if desired, may be omitted.

In operation of the device, the parachute 25 is packed within the parachute housing 23, and shroud lines 26 are run through the sliding cup 28 and retaining ring 29 and secured to the clevis pin 27. The attachment line 35 connected to the crown of parachute 25 is secured to the pin 34, the bell 32 is placed in abutting relation with the housing 23 and the pack opener is assembled in the condition illustrated in FIG. 1. As the bomb, mine or torpedo is released from the aircraft, an electrical signal is supplied through cable 46 to the time delay detonating caps 41. The detonating caps allow sufficient time for the device to clear the aircraft and then detonate the explosive 42, the gases of which acting against the face of stem 31 tend to force outwardly the sleeve 16 and the housing 12 attached thereto. The explosive force created by the detonation of the explosive 42 is sufficient to shear rivets 13 releasing the housing 12 and the sleeve 16 attached thereto allowing translation of sleeve 16 along the stem 31, this movement being aided by spring 36.

The translation of sleeve 16 along stem 31 is free until tie-lines 49 tighten, the velocity of the sleeve 16 and the attached housing 12 being sufficient to pull the bell-shaped member 32 after it and extracting the parachute 25 from within the housing 23. Movement of the shroud lines 26 through the sliding cup 28 and retaining ring 29 as the parachute 25 is extracted from the housing 23 is sufficient to move the cup along the inner surface of the housing 23 until the cup engages the expansion at the end of the housing as best illustrated in FIG. 2. The aperture within cup 28 through which the shroud lines 26 extend is longitudinally accurate and forms a smooth rounded edge over which the shroud lines are gathered and prevents cutting of the shroud lines by any sharp edge about which they may otherwise be gathered. The attachment line 35 is of sufficient strength to extract the parachute 25 from within the housing 23 but is insufficient to withstand the tension thereon when the shroud lines become tightened. Separation of the attachment line 35 detaches the pack opening mechanism from the crown of the parachute and prevents entanglement thereof with the parachute or the shroud lines.

As has been hereinbefore described, the tail fairing 14 may be attached to the housing of a larger parachute. Upon subsequent deployment of the main parachute, the extraction parachute will aid in the removal of the parachute housing and extraction of the main parachute and will suspend the main parachute housing to prevent entanglement thereof with the main parachute. On the other hand, if the parachute 25 contained in the tail fairing is sufficient to suspend the load attached thereto the device illustrated and described herein may be utilized alone. The tail fairing may be provided with a plurality of fins 52 to provide aerodynamic stability of the tail fairing 14 if subsequently separated from the load device or may be utilized to aid in the aerodynamic stability of the load device if not separated therefrom. The fins 52 may, of course, be omitted if desired.

Obviously many modifications and variations of the present invention are possible in light of the above teachings. It is, therefore, to be understood that within the scope of the appended claims, the invention may be practiced otherwise than as specifically described.

What is claimed as new and desired to be secured by Letters Patent of the United States is:

1. A parachute pack and pack opener comprising a parachute housing, a parachute packed within said housing, an explosive pack opener, a pack opener housing secured to said opener, means detachably securing said opener housing to said parachute housing, said opener comprising a hollow sleeve, an explosive fitting secured to and extending within said sleeve, a bell-shaped member, a solid stem secured to said bell-shaped member, said stem extending within said sleeve, a plurality of tie-lines secured to said bell-shaped member and to said opener housing, said tie-lines being of such length so as to allow translation of said sleeve along said stem but preventing disengagement of said stem and said sleeve, means detachably securing said bell-shaped member to said parachute whereby when the explosive is detonated said opener housing is detached from said parachute housing, said sleeve is translated along said stem until said tie-lines tighten and said parachute is forcibly extracted from said parachute housing by the force of the explosion.

2. The combination of claim 1 wherein said bell-shaped member abuts said parachute housing and further comprises a spring engaging said bell-shaped member and said sleeve to hold said member tightly against said parachute housing and to aid in the tranlation of said sleeve along said stem.

3. The combination of claim 1 wherein said means detachably securing said bell-shaped member to said parachute is broken after said parachute is extracted.

4. The combination of claim 1 wherein said explosive fitting includes a plurality of time delay electrically fired detonating caps.

5. A parachute pack and pack opener comprising a parachute housing, a parachute packed within said housing, retaining means secured to one end of said housing, shroud lines each attached at one end thereof to said parachute and having their other ends secured to said retaining means, an explosive pack opener, a pack opener housing secured to said opener, means detachably securing said opener housing to said parachute housing, said opener comprising a hollow sleeve, an explosive fitting secured to and extending within said sleeve, a flange member mounted at the other end of said housing, a solid stem secured to said flange member, said stem extending within said sleeve, a plurality of tie-lines secured to said flange member and to said opener housing, said tie-line being of such length so as to allow translation of said sleeve along said stem but preventing disengagement of said stem and said sleeve, means detachably securing said flange member to said parachute including an attachment line of sufficient strength to extract said parachute from within said housing but insufficient to withstand tension thereon when said shroud lines become tightened whereby when the explosive is detonated said opener housing is detached from said parachute housing, said sleeve is translated along said stem until said tie-lines tighten and said parachute is thereafter forcibly extracted from parachute housing by the force of the explosion.

6. The combination of claim 1 further including a tail fairing, and a plurality of rivets securing said opener housing to said fairing and adapted to be sheared to release said opener housing from said fairing when said parachute is forcibly extracted from said parachute housing.

7. The combination of claim 5 which further includes a tail fairing, a plurality of rivets securing said opener housing to said fairing and adapted to be sheared to release said opener from said fairing when said parachute is forcibly extracted from said parachute housing.

References Cited in the file of this patent

UNITED STATES PATENTS

| | | |
|---|---|---|
| 2,513,867 | Heffernan | July 4, 1950 |
| 2,798,683 | Sevenson | July 9, 1957 |
| 2,812,148 | Fogal et al. | Nov. 5, 1957 |
| 2,948,563 | Landry | Aug. 9, 1960 |
| 2,967,685 | Magnuson | Jan. 10, 1961 |
| 3,032,356 | Botsford | May 1, 1962 |